(12) United States Patent
Haas et al.

(10) Patent No.: US 7,997,657 B2
(45) Date of Patent: Aug. 16, 2011

(54) BELT BUCKLE ATTACHMENT ASSEMBLY

(75) Inventors: Peter Haas, Eschach (DE); Ralf Knoedl, Alfdorf (DE)

(73) Assignee: TRW Automotive GmbH, Alfdorf (DE)

( * ) Notice: Subject to any disclaimer, the term of this patent is extended or adjusted under 35 U.S.C. 154(b) by 288 days.

(21) Appl. No.: 12/001,165

(22) Filed: Dec. 10, 2007

(65) Prior Publication Data

US 2008/0136156 A1 Jun. 12, 2008

(30) Foreign Application Priority Data

Dec. 11, 2006 (DE) .................. 10 2006 058 226

(51) Int. Cl.
*A47D 15/00* (2006.01)

(52) U.S. Cl. ........ 297/468; 297/473; 297/481; 297/485; 280/801.1

(58) Field of Classification Search .................. 297/473, 297/481, 482, 485, 468, 463.1; 280/801.1, 280/801.2, 808, 733; 24/684
See application file for complete search history.

(56) References Cited

U.S. PATENT DOCUMENTS

| | | | | | |
|---|---|---|---|---|---|
| 3,258,293 | A | * | 6/1966 | Sharp | 297/483 |
| 4,132,434 | A | * | 1/1979 | Takahashi et al. | 297/481 |
| 4,133,556 | A | * | 1/1979 | Glinski | 280/801.1 |
| 4,451,087 | A | * | 5/1984 | Tamamushi | 297/468 |
| 4,598,951 | A | * | 7/1986 | Ono | 297/483 |
| 4,611,854 | A | * | 9/1986 | Pfeiffer | 297/468 |
| 4,645,232 | A | * | 2/1987 | Hamada et al. | 280/801.1 |
| 4,832,409 | A | * | 5/1989 | Borlinghaus et al. | 297/468 |
| 4,928,992 | A | * | 5/1990 | Qvint et al. | 280/801.1 |
| 5,236,220 | A | * | 8/1993 | Mills | 280/801.1 |
| 5,332,261 | A | * | 7/1994 | Siepierski | 280/801.1 |
| 5,855,047 | A | * | 1/1999 | Haas | 24/684 |
| 5,961,147 | A | * | 10/1999 | Wier | 280/801.1 |
| 6,142,525 | A | * | 11/2000 | Boelstler et al. | 280/808 |
| 6,581,969 | B2 | * | 6/2003 | Nishide | 280/801.1 |
| 7,364,200 | B2 | * | 4/2008 | Downey | 280/801.1 |
| 7,384,103 | B2 | * | 6/2008 | Rausch et al. | 297/473 |
| 7,497,474 | B2 | * | 3/2009 | Sanchez et al. | 280/801.1 |
| 7,530,600 | B2 | * | 5/2009 | Di Grande | 280/801.1 |
| 2005/0077718 | A1 | * | 4/2005 | Desmarais et al. | 280/808 |
| 2006/0017275 | A1 | | 1/2006 | Sanchez et al. | |

FOREIGN PATENT DOCUMENTS

| | | |
|---|---|---|
| DE | 29700908 | 6/1997 |
| DE | 10310348 | 9/2004 |
| DE | 102004051761 | 3/2006 |
| JP | 06247254 A * | 9/1994 |

* cited by examiner

*Primary Examiner* — Laurie K Cranmer
(74) *Attorney, Agent, or Firm* — Tarolli, Sundheim, Covell & Tummino LLP

(57) ABSTRACT

An assembly to attach a belt buckle (12) to a vehicle, especially to a vehicle body part (16), has an attachment fitting (14) which is fixed in place directly at the belt buckle (12), is made in one piece, and is movable together with the belt buckle (12), the attachment fitting (14) being adapted to assume an initial position, an attachment member (22) and a spring member (28) which urges the attachment fitting (14) that is movable relative to the vehicle into the initial position. The attachment member (22) fixes the attachment fitting (14) in place directly at the vehicle body part (16).

12 Claims, 4 Drawing Sheets

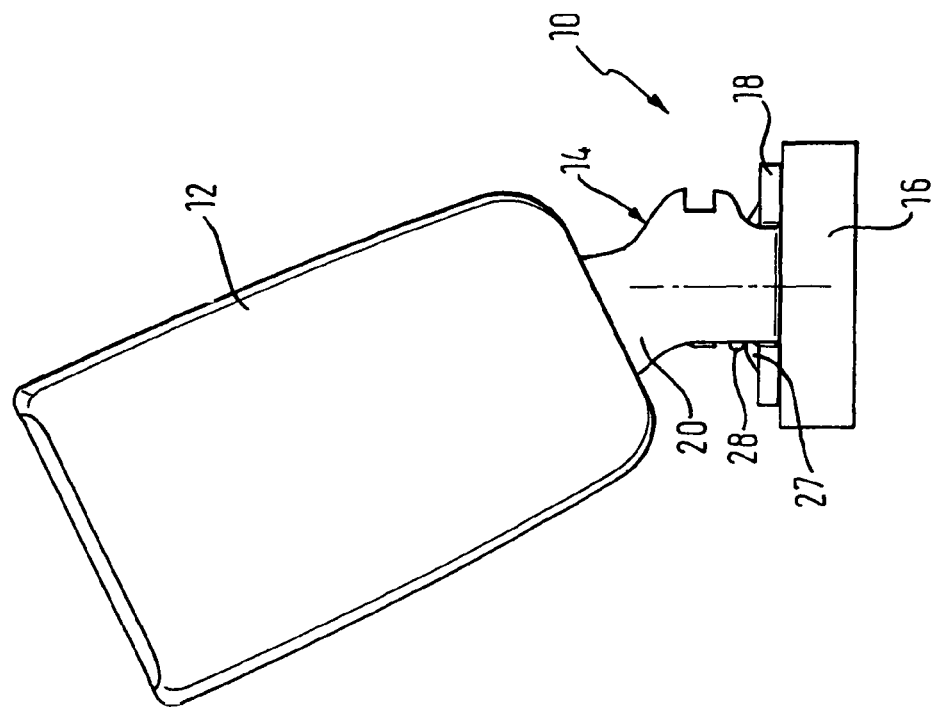
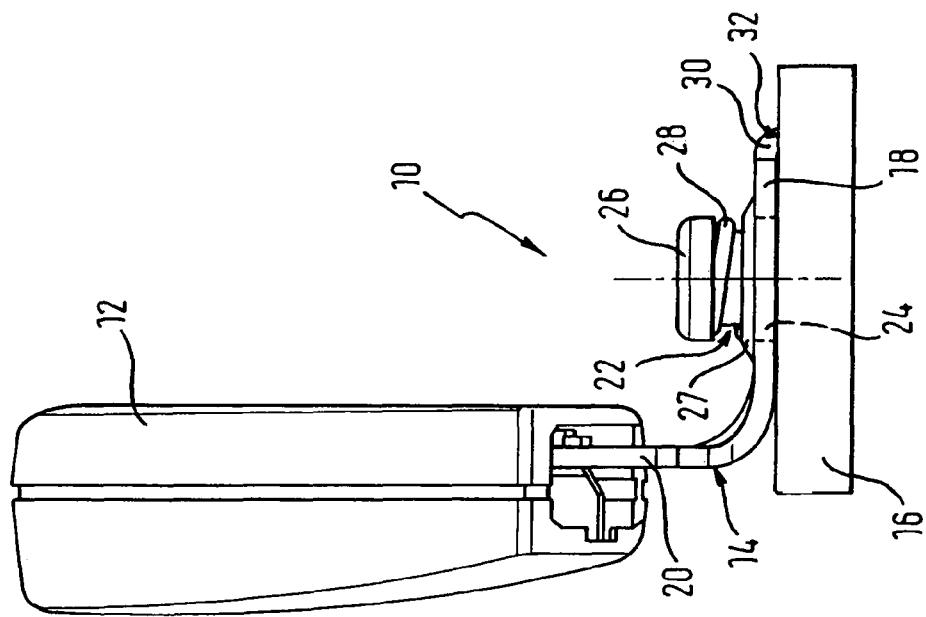

BELT BUCKLE ATTACHMENT ASSEMBLY

TECHNICAL FIELD

The present invention relates to an assembly to attach a belt buckle to a vehicle, especially to a vehicle body part, including an attachment fitting which is fixed in place directly at the belt buckle, is made in one piece, and is movable together with the belt buckle, an attachment member, and a spring member which urges the attachment fitting that is movable relative to the vehicle into an initial position.

BACKGROUND OF THE INVENTION

Such an assembly is disclosed in DE 297 00 908 U1. The attachment fitting fixed in place at the belt buckle is rotatably connected, by means of a bolt, to a retaining fitting secured to the vehicle. Provided between the attachment fitting and the retaining fitting is a spiral spring which urges the attachment fitting into its initial position.

The invention provides an assembly to attach a belt buckle to a vehicle, which assembly distinguishes itself by a simple structure and a high mobility of the belt buckle.

BRIEF SUMMARY OF THE INVENTION

According to the invention, an assembly to attach a belt buckle to a vehicle, especially to a vehicle body part, has an attachment fitting which is fixed in place directly at the belt buckle, is made in one piece, and is movable together with the belt buckle, the attachment fitting being adapted to assume an initial position, an attachment member and a spring member which urges the attachment fitting that is movable relative to the vehicle into the initial position. The attachment member fixes the attachment fitting in place directly at the vehicle body part. Since, therefore, an additional retaining fitting may be dispensed with, the assembly according to the invention manages with a particularly small number of components. A further advantage resides in that the virtual swivel axes of the belt buckle relative to the vehicle are situated in the region of the attachment to the vehicle, as a result of which the belt buckle can assume a large number of positions.

A particularly simple and space-saving construction is obtained if the attachment member projects through the spring member.

In order to ensure the mobility of the attachment fitting in relation to the vehicle, the attachment member may project through an opening of the attachment fitting with lateral clearance.

Preferably, the attachment fitting includes a section that is substantially parallel to the adjacent vehicle body part, more precisely to the surface of the attachment portion, the attachment member projecting through the section and the spring member engaging the section. This fixes the parallel section and, hence, the attachment fitting in place at the vehicle body part, the spring member allowing a swiveling movement of the attachment fitting relative to the vehicle body part.

More particularly, starting from the parallel section, the attachment fitting has an end to attach the belt buckle, the end being preferably bent through 90 degrees.

An especially reasonably priced configuration is obtained if the attachment member used is a collar screw.

The spring member preferably is a pressure spring such as, e.g., a helical spring, a rubber or the like. In any case, the spring member and its fastening means may be of a considerably simpler structure than the comparatively complicated spiral spring and its mounting as known from the prior art.

In an advantageous further development, the attachment fitting includes a projection which engages into a recess of the vehicle body part to secure against rotation. This projection is more particularly arranged on the parallel section and has the shape of a hook.

In accordance with a first embodiment of the invention, the spring member is arranged between the attachment fitting and the vehicle body part.

Alternatively or additionally, a spring member may be arranged between the attachment fitting and a widened head of the attachment member.

BRIEF DESCRIPTION OF THE DRAWINGS

FIG. 6 shows a side view of an assembly according to a second embodiment of the invention; and FIG. 7 shows a rear view of the assembly of FIG. 6.

BRIEF DESCRIPTION OF THE PREFERRED EMBODIMENTS

Figure 1:
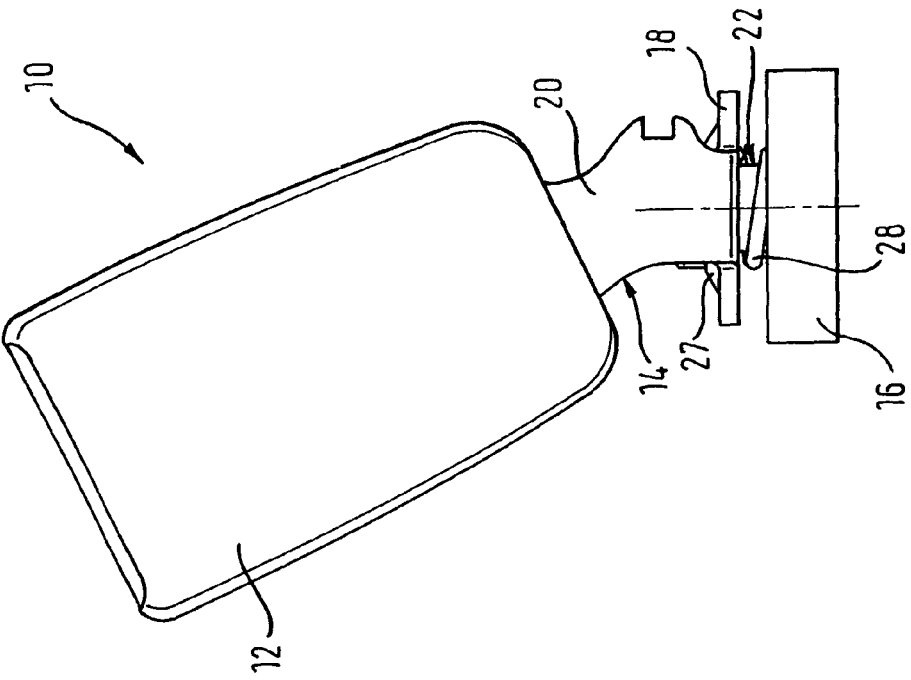
FIG. 1 shows a side view of an assembly according to a first embodiment of the invention.
Figure 2:
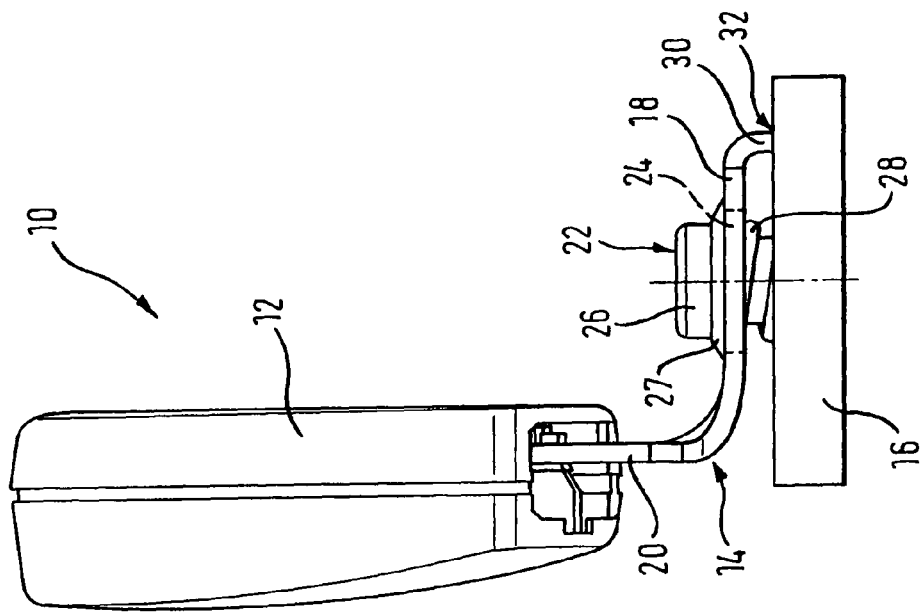
FIG. 2 shows a rear view of the assembly of FIG. 1.
Figure 3:
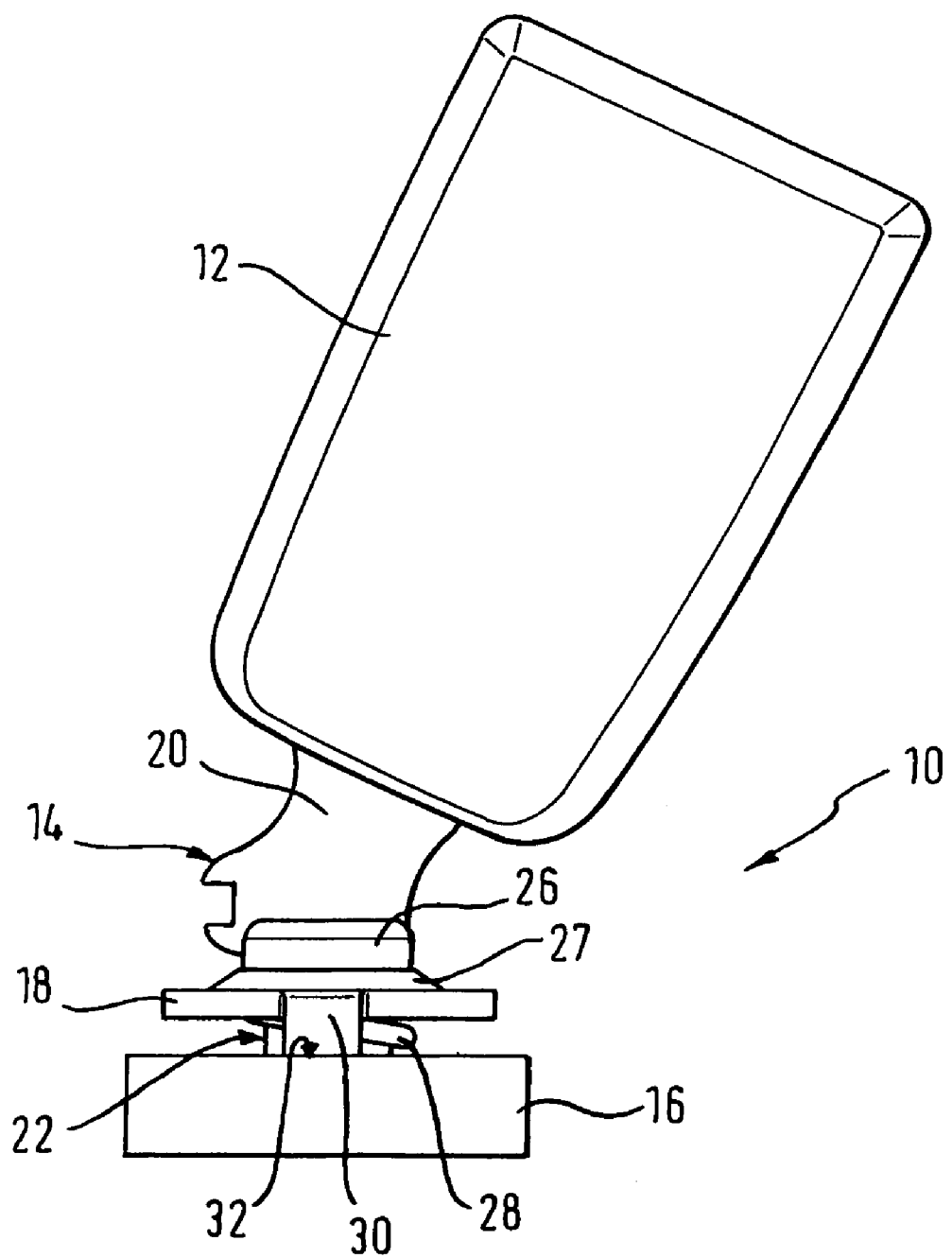
FIG. 3 shows a front view of the assembly of FIG. 1.

FIGS. 1 to 5 illustrate an assembly 10 for attaching a belt buckle 12 to a vehicle according to a first embodiment of the invention. The assembly 10 includes an attachment fitting 14 which has a section 18 that is substantially parallel to an adjacent vehicle body part 16 and, starting from the parallel section 18, has an end 20 which is bent through roughly 90 degrees and at which the belt buckle 12 is directly fixed in place. The attachment fitting 14 is made in one piece and is movable together with the belt buckle 12.

The assembly 10 further comprises an attachment member 22, here in the form of a collar screw, which secures the attachment fitting 14, or the parallel section 18 thereof, directly to the vehicle body part 16. For this purpose, the attachment member 22 projects through an opening 24 in the attachment fitting 14, more precisely in the parallel section 18 and, at its end opposite a widened head 26, is connected to, in the present case bolted to, the vehicle body part 16. To allow a swiveling movement of the attachment fitting 14 relative to the vehicle body part 16, the attachment member 22 projects through the opening 24 with lateral clearance. In the embodiment shown, the diameter of the opening 24 is even about 1.5 mm larger than the widened head 26 of the attachment member 22 (in this case the collar of the collar screw), which is the reason why a locking washer 27 is arranged between the head 26 of the attachment member 22 and the attachment fitting 14, more precisely the parallel section 18. A spring member 28 in the form of a pressure spring, in the present case a helical spring, is supported at the locking washer 27, the attachment member 22 projecting through the spring member 28. The other end of the spring member 28 rests against the vehicle body part 16, so that the spring member 28 here is arranged between the attachment fitting 14 (more precisely the parallel section 18) and the vehicle body part 16. The spring member 28 urges the attachment fitting 14, which is movable in relation to the vehicle, into the initial position shown in FIGS. 1 to 3.

The attachment fitting 14 or, to be more precise, the parallel section 18, further includes a projection 30 which engages into a recess 32 of the vehicle body part 16 to constitute a locking means preventing rotation of the attachment fitting 14. The projection 30 is schematically shown in FIGS. 4 and 5.

Figure 4:
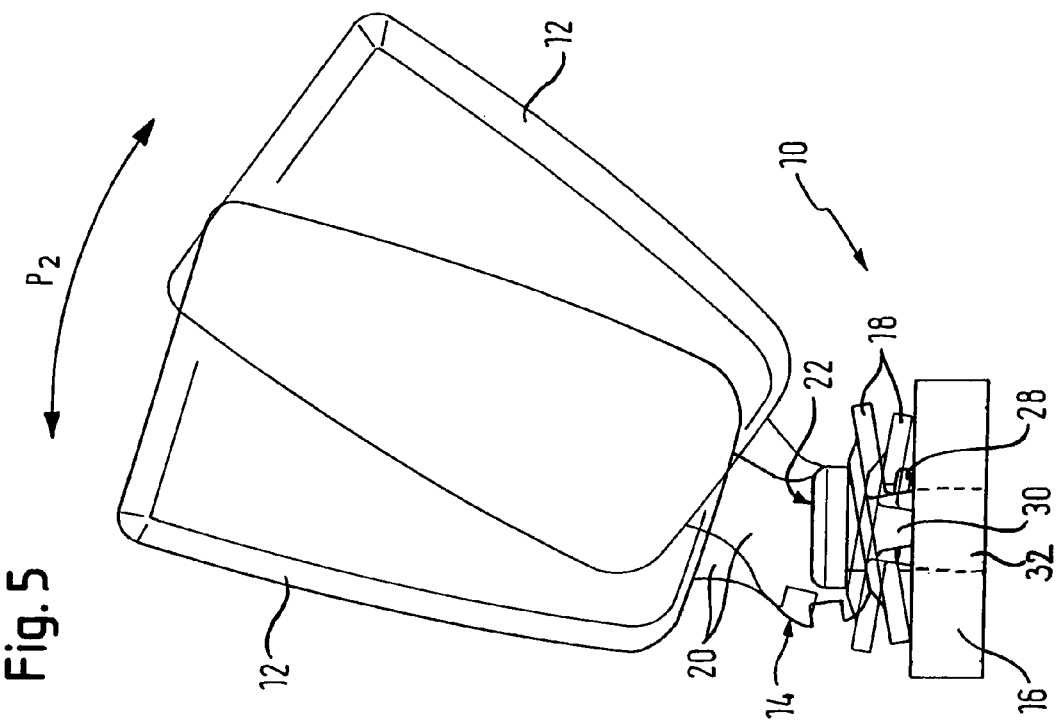
FIG. 4 shows a side view of the assembly of FIG. 1 in a swiveling movement of the belt buckle.
Figure 5:
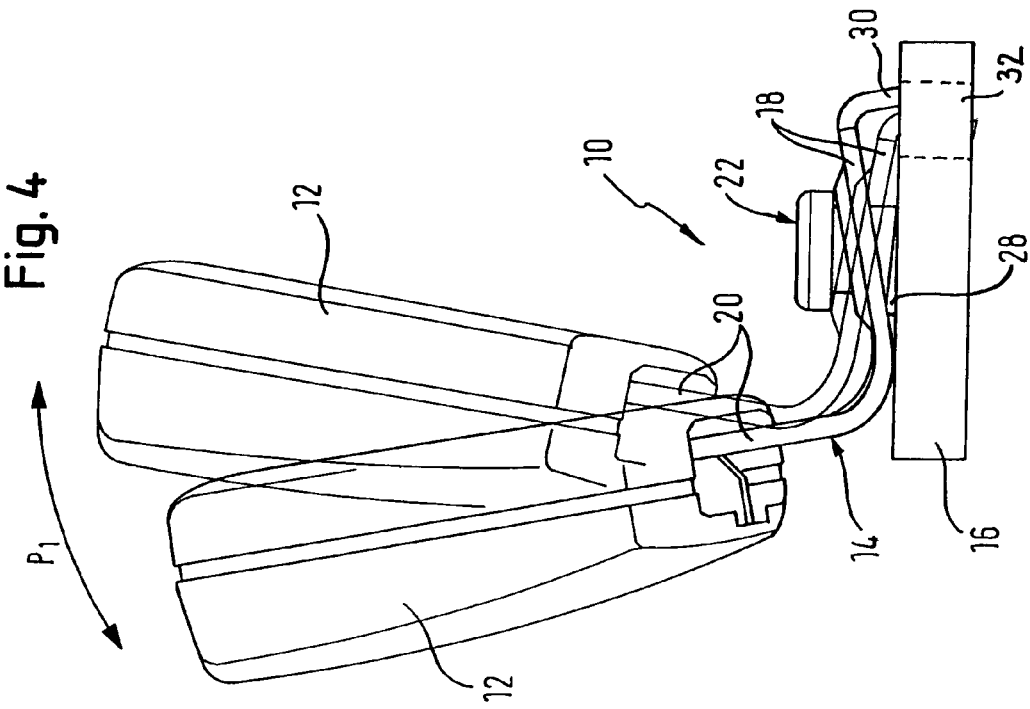
FIG. 5 shows a front view similar to FIG. 3 in a swiveling movement of the belt buckle in another plane.

The assembly 10 according to the invention allows the belt buckle 12 to perform swiveling movements relative to the vehicle body part 16 in different directions, as is illustrated in FIGS. 4 and 5. More specifically, a swiveling movement is possible both perpendicularly to the plane defined by the end 20 of the attachment fitting 14 (see arrow $P_1$ in FIG. 4) and in this plane (cf. FIG. 5, arrow $P_2$).

FIGS. 6 and 7 show an assembly 10 according to a second embodiment of the invention, with identical or functionally identical components being denoted by the same reference numerals below, and only the differences from the previously described first embodiment being discussed.

In the assembly 10 in accordance with the second embodiment, the spring member 28 is arranged between the attachment fitting 14 or, to be more precise, the parallel section 18, and the widened head 26 of the attachment member 22; in this case, too, the locking washer 27 rests immediately against the parallel section 18 on the side thereof facing the head 26. Otherwise, in terms of design and operation, the assembly 10 of FIGS. 6 and 7 corresponds to the one already described above.

The invention claimed is:

1. A belt buckle attachment assembly for attachment of a belt buckle (12) to a vehicle, comprising:
    an attachment fitting (14) which is fixed in place directly at said belt buckle (12), is made in one piece, and is movable together with said belt buckle (12), said attachment fitting (14) being adapted to assume an initial position,
    an attachment member (22), and
    a spring member (28) which urges said attachment fitting (14) that is movable relative to said vehicle into said initial position,
    said attachment member (22) fixing said attachment fitting (14) in place directly at a vehicle body part (16), said vehicle body part (16) having a recess (32) and said attachment fitting (14) including a projection (30) which engages into said recess (32) of said vehicle body part (16) to secure against rotation,
    said attachment fitting (14) including a section (18) that is substantially parallel to said vehicle body part (16), said attachment member (22) projecting through said parallel section (18) and said spring member (28) engaging said parallel section (18), wherein, starting from said parallel section (18), said attachment fitting (14) has an end (20) to attach said belt buckle (12), said end (20) being bent through 90 degrees.

2. The assembly according to claim 1, wherein said attachment member (22) projects through said spring member (28).

3. The assembly according to claim 1, wherein said attachment fitting (14) comprises an opening (24), said attachment member (22) projecting through said opening (24) of said attachment fitting (14) with lateral clearance.

4. The assembly according to claim 1, wherein said attachment member (22) is a collar screw.

5. The assembly according to claim 1, wherein said spring member (28) is a pressure spring.

6. The assembly according to claim 1, wherein said spring member (28) is arranged between said attachment fitting (14) and said vehicle body part (16).

7. The assembly according to claim 1, wherein said attachment member (22) has a widened head (26), said spring member (28) being arranged between said attachment fitting (14) and said widened head (26) of said attachment member (22).

8. The assembly according to claim 1, wherein said attachment fitting (14) abuts on said vehicle body part (16).

9. The assembly according to claim 1, wherein said attachment member (22) extends along an axis, said attachment fitting (14) being axially movable relative to said attachment member (22).

10. The assembly according to claim 1, wherein the projection (30) extends substantially parallel to the end (20) attached to the belt buckle (12) and bent through 90 degrees relative to the parallel section (18).

11. A belt buckle attachment assembly for attachment of a belt buckle (12) to a vehicle, comprising:
    an attachment fitting (14) which is fixed in place directly at said belt buckle (12), is made in one piece, and is movable together with said belt buckle (12), said attachment fitting (14) being adapted to assume an initial position,
    an attachment member (22), and
    a spring member (28) which urges said attachment fitting (14) that is movable relative to said vehicle into said initial position,
    said attachment member (22) fixing said attachment fitting (14) in place directly at a vehicle body part (16), said attachment fitting (14) including a section (18) that is substantially parallel to said vehicle body part (16), said attachment member (22) projecting through said parallel section (18) and said spring member (28) engaging said parallel section (18), wherein, starting from said parallel section (18), said attachment fitting (14) has an end (20) to attach said belt buckle (12), said end (20) being bent through 90 degrees.

12. A belt buckle attachment assembly for attachment of a belt buckle (12) to a vehicle, comprising:
    an attachment fitting (14) which is fixed in place directly at said belt buckle (12), is made in one piece, and is movable together with said belt buckle (12), said attachment fitting (14) being adapted to assume an initial position,
    an attachment member (22), and
    a spring member (28) which urges said attachment fitting (14) that is movable relative to said vehicle into said initial position,
    said attachment member (22) fixing said attachment fitting (14) in place directly at a vehicle body part (16), wherein said vehicle body part (16) has a recess (32) and said attachment fitting (14) includes a projection (30) which engages into said recess (32) of said vehicle body part (16) to secure against rotation.

* * * * *